(12) United States Patent
Komiya

(10) Patent No.: US 7,013,630 B2
(45) Date of Patent: Mar. 21, 2006

(54) CABLE OR THE LIKE PROTECTION AND GUIDE DEVICE

(75) Inventor: Shoichiro Komiya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 73 days.

(21) Appl. No.: 10/799,194

(22) Filed: Mar. 12, 2004

(65) Prior Publication Data

US 2004/0237498 A1  Dec. 2, 2004

(30) Foreign Application Priority Data

Apr. 28, 2003  (JP) .............................. 2003-123853

(51) Int. Cl.
*F16G 13/16* (2006.01)
(52) U.S. Cl. ............................ 59/78.1; 59/900; 248/49
(58) Field of Classification Search ................. 59/78.1, 59/900; 248/49, 51
See application file for complete search history.

(56) References Cited

U.S. PATENT DOCUMENTS

| | | | |
|---|---|---|---|
| 5,108,350 A * | 4/1992 | Szpakowski | 59/78.1 |
| 5,201,885 A * | 4/1993 | Wehler et al. | 59/78.1 |
| 5,220,779 A * | 6/1993 | Tatsuta et al. | 59/78.1 |
| 6,176,072 B1 * | 1/2001 | Weber | 59/78.1 |

FOREIGN PATENT DOCUMENTS

| | | |
|---|---|---|
| DE | 9014027 U1 | 12/1990 |
| DE | 200 05 042 U1 | 9/2000 |
| DE | 29921667 U1 | 4/2001 |
| JP | 2000-120807 | 4/2000 |

* cited by examiner

*Primary Examiner*—David Jones
(74) *Attorney, Agent, or Firm*—Woodling, Krost and Rust

(57) ABSTRACT

A cable or the like protection and guide device, which can prevent rubbing damage or the production of wear powders in a cable or the like is disclosed. Link bodies (11) are articulably connected to each other in the longitudinal direction with a cable or the like (12) inserted. Each link body (11) comprises a pair of link plates (13) spaced on both sides of the cable or the like (12), connecting plates (14, 15), which are bridged on the articulation outer circumferential side and the articulation inner circumferential side of the link plate, and a partitioning plate (31) supported on at least articulation inner circumferential side connecting plate, which faces the link plates. Each connecting plate includes connecting engagement portions (32, 37) formed at non-contact positions of a front end surface and a rear end surface, and the partitioning plate includes a pair of front and rear partitioning plate engagement portions (34, 36) formed on at least the articulation inner circumferential side and which sandwich said connecting engagement portions when engaged therewith.

3 Claims, 4 Drawing Sheets

CABLE OR THE LIKE PROTECTION AND GUIDE DEVICE

This patent application includes a claim of foreign priority to prior filed Japanese Patent Application 2003-123853 filed Apr. 28, 2003.

TECHNICAL FIELD TO WHICH THE INVENTION PERTAINS

The present invention relates to a cable or the like protection and guide device, and more specifically relates to a device for guiding and protecting a cable or the like such as a cable or a hose, which connects a movable portion to a stationary portion in an industrial machine.

RELATED ART

As this kind of conventional cable or the like protection and guide device, a device, in which link bodies each having a pair of link plates spaced and facing each other and the inside space is formed in a rectangular shape are articulably connected, and a cable or the like is inserted, has been known (refer to for example, Patent Reference 1).

In this cable or the like protection and guide device, a partitioning plate is vertically provided at an appropriate position between link plates and partitions the internal space into the right and left spaces. Further, a shelf plate vertically partitions the internal spaces partitioned into the right and left spaces.

The mounting positions of the partitioning plate and shelf plate can be changed. Thus, upper and lower pair of connecting plates include mounting grooves extending in a direction vertical to the articulation direction of the device on opposite surfaces and a holding groove disposed in parallel with the mounting grooves. The partitioning plate includes a protrusion and a hook at upper and lower edges. The mounting of the partitioning plate on the connecting plate is performed by fitting the protrusion into the mounting groove and fitting the hook into the holding groove and by elastically deforming the hook so that a wall between the mounting groove and the holding groove is supported together with the protrusion. The mounting position of the partitioning plate is carried out by selecting angular grooves forming the mounting groove. Further, the shelf plate comprises extendably fitted pair of body plate and drawing plate. An engagement end portion is formed on an end portion of the body plate and a fitting protrusion, which is fitted into a fitting concave portion, is formed on an end of a drawing plate. There are an engagement portion and an engagement hole, into which a fitting end portion and a fitting protrusion are fitted in a partitioning plate and a link plate. The engagement portion and fitting hole are provided in the plural number on the partitioning plate in the vertical direction of the plate. The shelf plate is adapted to be mounted by extending or contracting the partitioning plate to select the engagement portion and the fitting hole irrespective of the size of the link body.

Patent Reference 1 is Japanese Laid-open Patent Publication No. 2000-120807.

Problems to be Solved by the Invention

In the conventional cable or the like protection and guide device, cables or the like are protected in a cable-inserted space formed by connecting a plurality of link plates, without fixing the cable or the like in a cable or the like inserted manner. And a relative shift, rubbing, dragging and the like between the cables or the like are induced due to relative polygonal movement of the link plates at transition portions from a linear area to a curved area of the cable or the like inserted space or from a curved area to a linear area thereof, during the traveling of the cables or the like. Particularly, in the above-mentioned conventional cable or the like protection and guide device, since the mounting groove and the holding groove in the connecting plate extend fully between a pair of the link plates and the mounting groove is composed of connected angular grooves for changing the position of the partitioning plate, the cables or the like are rubbed by the edges of the mounting groove and holding groove so that they are liable to obtain rubbing damage. This rubbing is more violently generated by high speed and high frequency operation of the cable or the like protection and guide device to damage the cable or the like for a short period of time and to produce wear powders. Accordingly, there was a problem of cleanliness.

The object of the present invention is to obtain a cable or the like protection and guide device, which can prevent rubbing damage or the production of wear powders in a cable or the like.

Means for Solving the Problems

To attain the above-mentioned object, a cable or the like protection and guide device in which a plurality of link bodies, each comprising a pair of link plates spaced on both sides of the cable or the like, connecting plates each laterally bridged on the articulation outer circumferential and inner circumferential sides of said link plates, and a partitioning plate facing the link plates and supported by at least said articulation inner circumferential side connecting plate, are articulably connected in the longitudinal direction of the device with said cable or the like inserted therein, is characterized in that said connecting plate includes connecting engagement portions formed at non-contact positions of a front end surface and a rear end surface, and said partitioning plate includes a pair of front and rear partitioning plate engagement portions formed on at least articulation inner circumferential side and which sandwich said connecting engagement portions when engaged therewith.

The cable or the like protection and guide device is characterized in that said connecting plate engagement portions are provided along the width direction of said connecting plate and with a space from each other.

The cable or the like protection and guide device is characterized in that said connecting plate engagement portion and said partitioning plate engagement portion are formed in a trapezoid with an upper narrow side and a lower wide side.

The cable or the like protection and guide device is characterized in that said connecting plate engagement portion and said partitioning plate engagement portion are formed in a trapezoid with an upper narrow side and a lower wide side.

Action

In the cable or the like protection and guide device the connecting plate includes connecting engagement portions formed at non-contact positions of a front end surface and a rear end surface, and said partitioning plate includes a pair of front and rear partitioning plate engagement portions formed on at least articulation inner circumferential side and which sandwich said connecting engagement portions when engaged therewith. Accordingly, a connection structure to the partitioning plate is not needed on the inner surface of the connecting plate and the inner surface of the connecting plate is flatly formed. Thus, even if this cable or the like protection and guide device is in an articulation state or a linear state, a cable or the like is not rubbing-damaged by the inner surface of the connecting plate and wear powder is not produced.

According to the cable or the like protection and guide device the connecting plate engagement portions are provided along the width direction of the connecting plate and with a space from each other. Accordingly, in accordance with the accommodation space for the cable or the like, that is the size of the cable or the like, the space between the partitioning plate and the link plate or the space between the partitioning plates can be changed.

According to the cable or the like protection and guide device the connecting plate engagement portion and the partitioning plate engagement portion are formed in a trapezoid with an upper narrow side and a lower wide side. Accordingly, the partitioning plate is strongly connected to the connecting plate whereby it is not disconnected.

The invention will be better understood when reference is made to BRIEF DESCRIPTION OF THE DRAWINGS, DETAILED DESCRIPTION OF THE INVENTION and CLAIMS which follow hereinbelow.

A better understanding of the invention will be had when reference is made to the DETAILED DESCRIPTION OF THE INVENTION and CLAIMS which follow hereinbelow.

DETAILED DESCRIPTION OF THE INVENTION

Embodiments of the Invention

An example of a cable or the like protection and guide device according to the present invention will be described with reference to drawings below.

Figure 1:
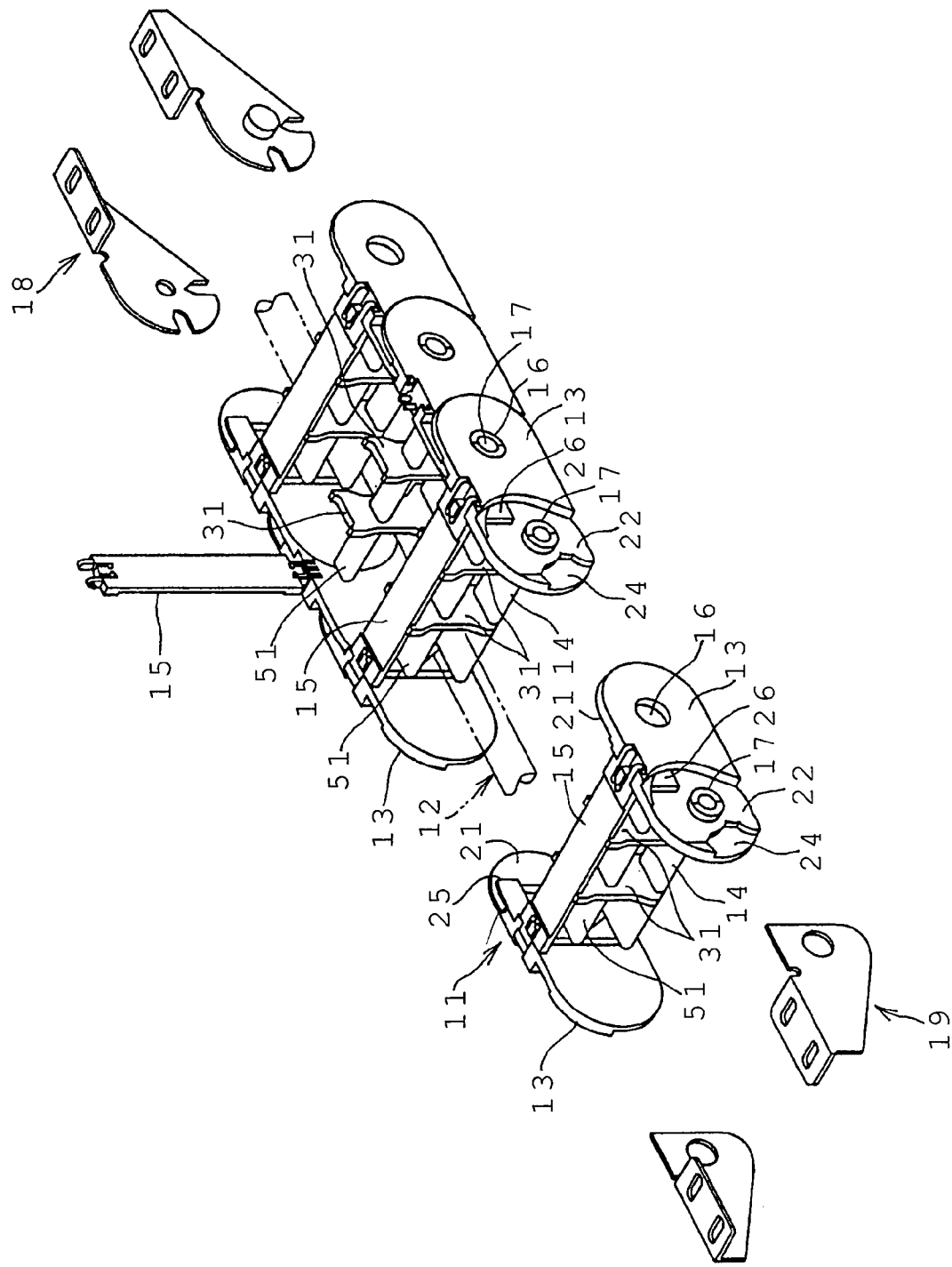
FIG. 1 is an exploded perspective view showing one example of a cable or the like protection and guide device according to the present invention.

This cable or the like protection and guide device comprises a plurality of link bodies 11 as shown in FIG. 1. These link bodies 11 are arranged in a row and are articulably or bendably connected to the adjacent link bodies 11. The cable or the like 12 is inserted into these link bodies 11.

Each link body 11 includes link plates 13 and connecting plates 14 and 15. The link plates 13 are arranged in parallel with each other. The connecting plate 14 (hereinafter referred to as an inner circumferential connecting plate to be differentiated from the other connecting plate 15) is arranged between link plates 13 so as to bridge the inner circumferential sides of the link plates 13. The inner circumferential connecting plate 14 and the link plates 13 are composed of plastic and are integrally molded. The other connecting plate 15 (hereinafter referred to as an outer circumferential connecting plate) is also composed of the same plastic molded product, and is arranged between the link plates 13 so as to bridge the outer circumferential sides of the link plates 13. This outer circumferential connecting plate 15 is attached to the link plates 13 in an openable manner.

Figure 2:
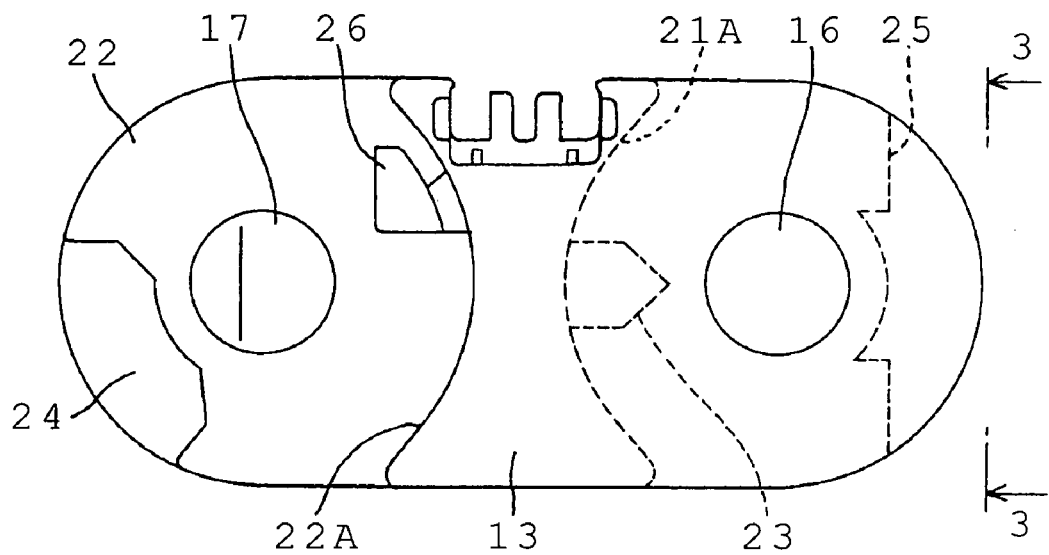
FIG. 2 is a side view of a link body.
Figure 4:
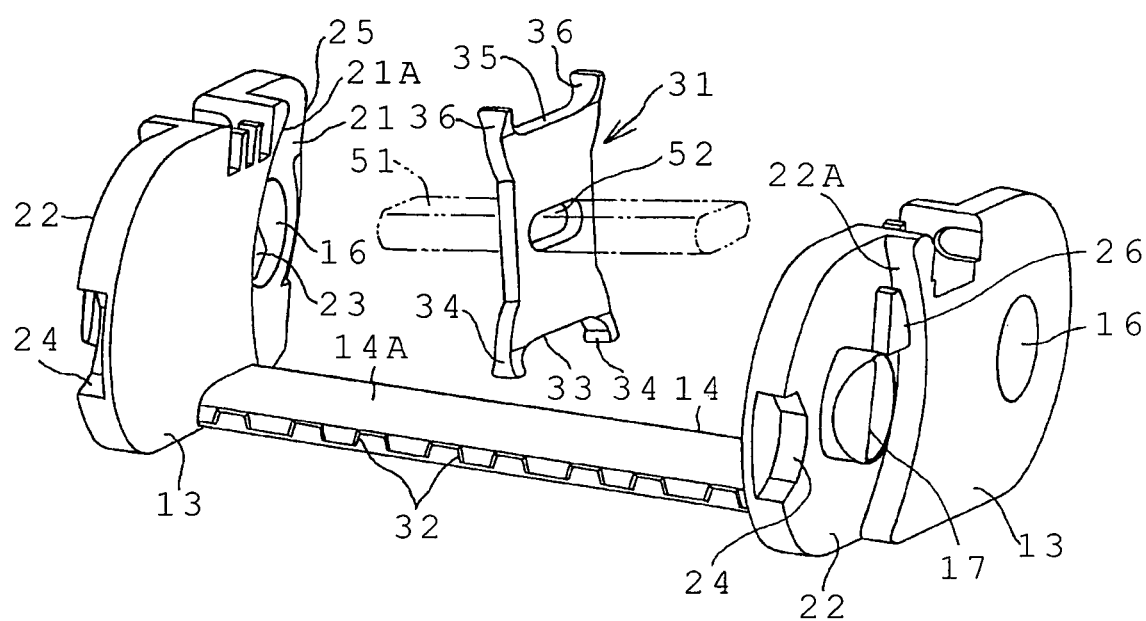
FIG. 4 is a perspective view of a state where a partitioning plate was separated from the link body.

The link plate 13 has a shape of a cocoon when viewed from the side, as shown in FIG. 2. A front portion of the link plate 13 is provided with a pin hole 16. A rear portion of the link plate 13 is integrally provided with a pin 17 having a diameter corresponding to that of the pin hole 16. The front inner surface of the link plate 13 is provided a stepped wall 21 as shown in FIGS. 1 and 4. The rear edge of the stepped wall 21 on the front inner surface forms a partial cylindrical surface 21A, which is coaxial with the pin hole 16. Further, a rear outer surface of the link plate 13 is provided with a stepped wall 22. The front edge of the rear outer surface side stepped wall 22 forms a partial cylindrical surface 22A, which is coaxial with the pin 17. The inside space in the front inner surface side stepped wall 21 is slightly wider than the outside space in the rear outer surface side stepped wall 22.

The respective link bodies 11 are connected by fitting the front inner surface side stepped walls 21 to the rear outer surface side stepped walls 22 of the front adjacent link bodies, and the pin hole 16 to the pin 17 of the front adjacent link body 11, and by fitting the rear outer surface side stepped walls 22 to the front inner surface side stepped walls 21 of the adjacent link bodies and the pin 17 to the pin hole 16 of the adjacent link body 11, as shown in FIG. 1. Therefore, each link body 11 can be pivoted or articulated about the pin 17 with respect to the adjacent link body 11.

Into each link body 11 is incorporated a mechanism for limiting a bend or pivot angle. This bend angle limiting mechanism has the same configuration as described in the specification of Japanese patent No. 3122491. When the link bodies 11 are in a linear state, an arrow protrusion 23 on the front inner surface side stepped wall 21 of the link body shown in FIG. 2 contacts an upper end side of a fan-shaped recess 24 on the rear outer surface side stepped wall 22 of the adjacent link body 11, and a flat limiting surface 25 on a rear end of the rear outer surface side stepped wall 22 contacts a hook-shaped protrusion 26 on the rear outer surface side stepped wall 22 of the front adjacent link body 11. On the other hand, when the link bodies 11 are in an articulation state, the arrow protrusion on the front inner surface side stepped wall 21 contacts a lower end side of the fan-shaped recess 24 in the rear outer surface side stepped wall 22.

Figure 3:
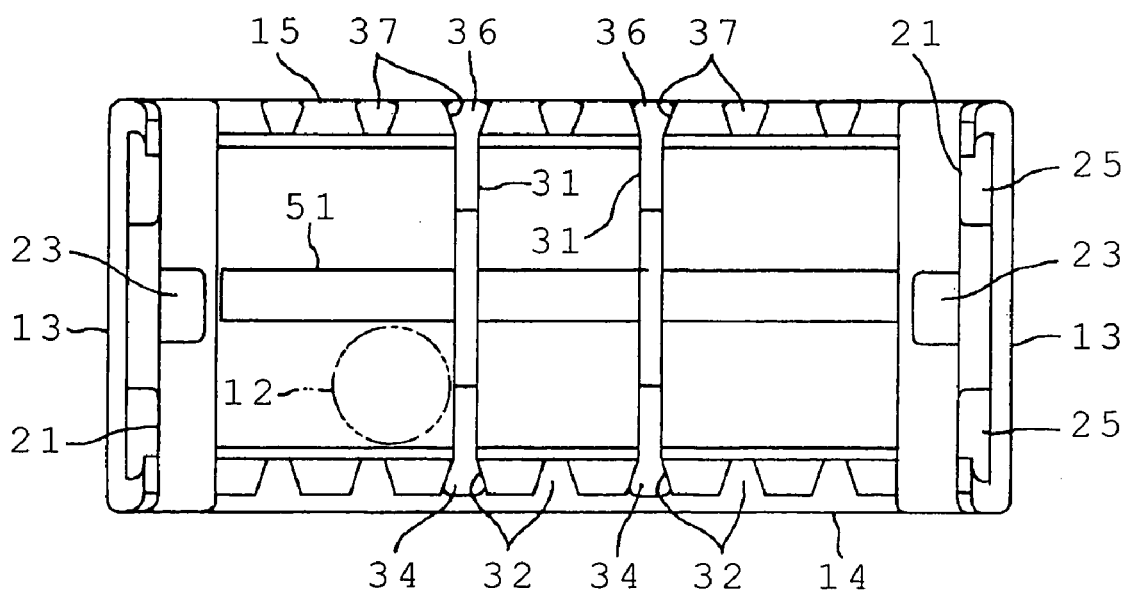
FIG. 3 is an end view of the link body taken along the line 3—3 in FIG. 2.

In this cable or the like protection and guide device, into each link body 11 are incorporated partitioning plates 31, which define the inner space of the link body 11 into a plurality of portions as shown in FIGS. 1, 3 and 4. The partitioning plate 31 is removably held by the inner circumferential side connecting plate 14 and the outer circumferential side connecting plate 15 at its upper and lower end.

Figure 5:
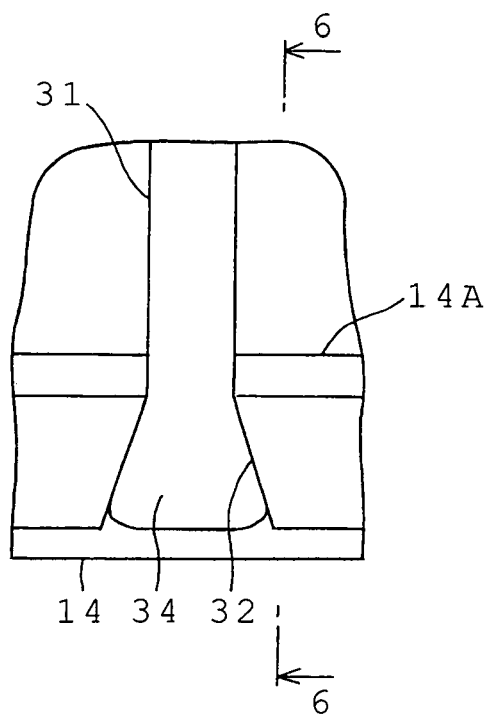
FIG. 5 is an enlarged end view of a connecting portion between a partitioning plate and a connecting plate.

The inner circumferential side connecting plate 14 has a flat inner surface 14A without concave and convex portions, and includes connecting engagement portions 32 on its front and rear edges. As shown in FIGS. 3 and 4, a plurality of connecting engagement portions 32 are provided at constant intervals in the width direction of the inner circumferential side connecting plate 14. As shown in FIG. 5, the connecting portion has a recess formed in the shape of a trapezoid with an upper narrow side and a lower wide side when viewed from the front side of the link body 11. The rear edge of the inner circumferential side connecting plate 14 is provided with connecting plate engagement portions having the same configuration linearly in parallel with said connecting plate engagement portions. The partitioning plate 31 has flat surfaces on both sides without concave and convex portions, and has a groove 33, which fits onto the inner surface 14A of the inner circumferential connecting plate 14 on the lower edge. Partitioning plate engagement portions 34 each have a form of protrusion and are formed at the front and rear portion of the lower edge of the partitioning plate 31 by the groove 33. The distance between the front and rear partitioning plate engagement portions 34 is slightly shorter than that the connecting plate engagement portions 32 on the front and rear edges of the inner circumferential side connecting plate 14.

Further, the outer circumferential side connecting plate 15 has a flat inner surface 15A without concave and convex portions, and includes connecting engagement portions 37 on its front and rear edges. As shown in FIG. 3, a plurality of connecting engagement portions 37 are also provided at constant intervals in the width direction of the outer circumferential side connecting plate 15. As shown in FIG. 5, the connecting portion has a recess form in a trapezoid with an upper wide side and a lower narrow side, which are opposite to the case of the connecting plate engagement portions 32 of the inner circumferential side connecting plate 15. The rear edge of the inner circumferential side connecting plate 14 is provided with connecting plate engagement portions having the same configuration linearly in parallel with said connecting plate engagement portions. The partitioning plate 31 includes a groove 35, which fits to the inner surface 15A of the outer circumferential side connecting plate 15, on the upper edge. A pair of partitioning plate engagement portions 36 are formed on the front and rear upper edge of the partitioning plate by this groove 35. The distance between the front and rear partitioning plate engagement portions 36 is slightly shorter than that the connecting plate engagement portions 37 on the front and rear edges of the outer circumferential side connecting plate 15.

The mounting of a partitioning plate 31 on a link body 11 is performed by allowing a curved groove 33 on the lower edge to contact the inner surface 14A of an inner circumferential side connecting plate 14 so that the front and rear partitioning plate engagement portions 34 on the lower edge are fitted to the front and rear connecting plate engagement portions 32 of the inner circumferential side connecting plate 14, and by allowing a curved groove 35 on the upper edge to contact the outer surface 15A of an inner circumferential side connecting plate 15 so that the front and rear partitioning plate engagement portions 36 on the upper edge are fitted to the front and rear connecting plate engagement portions 37 of the outer circumferential side connecting plate 15. After the completion of the mounting, the partitioning plate 31 is positioned between the connecting plates 14 and 15, so that the inner space of the link body 11 is defined to a plurality portions. Since the distance between the partitioning plate engagement portions 34 is slightly shorter than the distance between the front and rear connecting plate engagement portions 32 of the inner circumferential side connecting plate 14 and the distance between the partitioning plate engagement portions 36 is slightly shorter than the distance between the connecting plate engagement portions 37, as mentioned above, the partitioning plate 31 or the connecting plates 14, 15 or both of the partitioning plate 31 and the connecting plates 14, 15 can be elastically deformed so that the lower partitioning plate engagement portions 34 are fitted to the connecting plate engagement portions 32 and the upper partitioning plate engagement portions 36 are fitted to the connecting plate engagement portions 37. That is the partitioning plates 31 sandwich the connecting plates 14, 15 whereby they are positively fixed thereto. In this case the space between the link plate 21 and the partitioning plate 31 or the distance between the partitioning plates 31 can be freely adjusted by selecting the connecting plate engagement portions 37 in accordance with the diameters of the cables.

In a cable or the like protection and guide device according to the present invention a cable or the like such as a power source cable, which connects between a movable portion and a stationary portion in a tool machine, a cutting oil supply pipe or the like is inserted and this cable or the like protection and guide device is used for protecting this cable or the like and extending and contracting the cable or the like in accordance with the movement of the movable portion.

The incorporation of the cable or the like 12 is performed by opening outer circumferential side connecting plates 15 of all link bodies 11, inserting the cable or the like 12 into inner space defined by partitioning plates 31 in the respective link bodies and closing the outer circumferential side connecting plates 15. The mounting of the cable or the like protection and guide device on a tool machine is performed by pin-connecting a movable end fitting 18 and a fixed end fitting to the link bodies on both ends, connecting the movable end fitting 18 to a movable portion of the tool machine and the fixed end fitting 19 to a stationary portion and connecting this cable or the like protection and guide device to the earth through the movable end fitting 18 or the fixed end fitting 19.

When the movable portion of a tool machine is moved, the link bodies 11 are brought into a bend or articulation state, or a linear state. Then the cable or the like 12 is also bent or becomes in a linear state while being in contact with the inner surfaces 14A and 15A of the inner and outer circumferential side connecting plates 14 and 15 and the side surfaces of partitioning plates 31 and the lateral partitioning plate 51. In this case, the partitioning plates 31 are connected to the partitioning plate engagement portions 34 on their front and rear edges and to the connecting plate connecting engagement portions 32 on the front and rear edges of the connecting plates 14 and 15. There is no mechanism for connecting the partitioning plates 31 to the connecting plates 14, 15 in any portion of the inner surfaces 14A, 15A of the connecting plates 14, 15 and the sides of the partitioning plate 31. Accordingly, even if the cable or the like 12 rubs against these surfaces, it is not damaged by rubbing and does not produce even wear powder.

Figure 6:
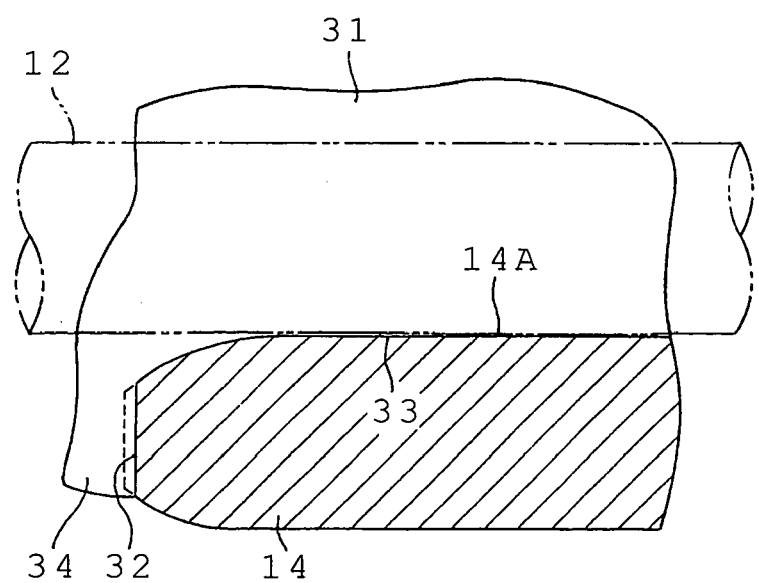
FIG. 6 is an enlarged cross-sectional view taken along the line 6—6 in FIG. 5.

Further, as shown in FIG. 6, the partitioning plate 31 is positioned by engaging the partitioning plate engagement portion 34 with the connecting plate engagement portion 32 substantially vertically positioned on the front and rear edges of the inner circumferential side connecting plate 14. Thus as long as the cable or the like 12 is not in a vertical state, it does not contact the connecting portion between the partitioning plate engagement portion 34 and the connecting plate engagement portion 32. Further, since the connecting plate engagement portion 37 of the outer circumferential connecting plate 15 is also substantially vertically disposed on its front and rear edge, the cable or the like 12 does not contact the connecting portion between the partitioning plate engagement portion 36 and the connecting plate engagement portion 37. Accordingly, the cable or the like 12 always contacts only the inner surfaces 14A, 15A of flat connecting plates 14, 15 and the sides of the partitioning plate 31, and it is not damaged by rubbing and does not produce wear powder due to the rubbing.

Further, since the partitioning plate engagement portion 34 of the partitioning plate 31 and the connecting plate engagement portion 32 of the inner circumferential side connecting plate 14 are formed in a trapezoidal shape with an upper narrow side and a lower wide side, and the partitioning plate engagement portion 36 of the partitioning plate 31 and the connecting plate engagement portion 37 of the inner circumferential side connecting plate 15 are formed in a trapezoidal shape with a lower narrow side and an upper wide side so as to be pulled out, even if this cable or the like protection and guide device is operated at high speed and high frequency, the partitioning plates 31 are not disconnected from the connecting plates 14, 15.

In this cable or the like protection and guide device, when the cables or the like 12 are disposed on vertical multi-steps, a lateral partitioning plate 51, which penetrates through the partitioning plate 31, is incorporated, as shown in FIGS. 1 and 4. Thus the partitioning plate 31 is provided with a lateral partitioning plate-inserting hole 52. The lateral partitioning plate-inserting hole 52 has the shape of an oval. The lateral partitioning plate 51 has a hollow or solid form having an oval cross-section corresponding to the shape of the lateral partitioning plate-inserting hole 52, and is made of metal or plastic or the like. The mounting of the lateral partitioning plate 51 onto the partitioning plate 31 is performed by press-fitting the lateral partitioning plate 51 into the lateral partitioning plate-inserting hole 52. This mounting of the lateral partitioning plate 51 further separates the respective cable or the like accommodation spaces defined by the respective link plates 13 and the partitioning plates 31 into two portions.

Since such a lateral partitioning plate support structure is positioned by press-fitting the lateral partitioning plate 51 to the lateral partitioning plate-inserting hole 52 in the partitioning plate 31, the surface of the lateral partitioning plate 51 can be formed flatly. Thus, when the link body 11 is in an articulation state or linear state, even if the cable or the like 12 slides while contacting the partitioning plate 31 and the lateral partitioning plate 51, the cable or the like 12 is not damaged by rubbing and does not generate wear powder.

It is noted that in the above-explained example, the forced positioning of the connecting plate 31 was performed by providing plate engagement portions 32 in the inner and outer circumferential side connecting plates 14 and 15 and fitting the partitioning plate engagement portions 34 of the upper and lower portions of the partitioning plate 31 to each connecting plate engagement portion 32. However, connecting plate engagement portions and partitioning plate engagement portions may be provided in only one of the connecting plates 14, 15 and the partitioning plate 31.

Further, although a plurality of connecting plate engagement portions 32 were provided in the width directions of the connecting plates 14 and 15, only one connecting plate engagement portion may be provided. And the connecting plate engagement portion 32 in the connecting plates 14, 15 may be formed as a protrusion and the partitioning plate engagement portion 34 of the partitioning plate 31 may be formed as a recess, which is opposite to the case explained above.

EFFECTS OF THE INVENTION

As mentioned above, in the cable or the like protection and guide device the connecting plate includes connecting engagement portions formed at non-contact positions of a front end surface and a rear end surface, and said partitioning plate includes a pair of front and rear partitioning plate engagement portions formed on at least the articulation inner circumferential side and which sandwich said connecting engagement portions when engaged therewith. Accordingly, the inner surface of the connecting plate and the side surface of the partitioning plate can be formed flatly, and a cable or the like is not damaged by rubbing. Further, the cable or the like does not produce wear powder. Therefore, even if the cable or the like protection and guide device is operated at high speed and high frequency, it possesses high durability and reliability, and can be used in a clean environment.

According to the cable or the like protection and guide device the connecting plate engagement portions are spaced apart from each other and provided along the width direction of the connecting plate. Accordingly, in accordance with the accommodation space for the cable or the like, that is the size of the cable or the like, the space between the partitioning plate and the link plate or the space between the partitioning plates can be changed.

According to the cable or the like protection and guide device the connecting plate engagement portion and the partitioning plate engagement portion are formed in a trapezoid with an upper narrow side and a lower wide side. Thus, since the partitioning plate is strongly connected to the connecting plate whereby it is not disconnected, higher durability and reliability can be obtained.

DESCRIPTION OF REFERENCE NUMERALS

11 . . . Link body
12 . . . Cable or the like
13 . . . Link plate
14 . . . Inner circumferential side connecting plate
15 . . . Outer circumferential side connecting plate
16 . . . Pin hole
17 . . . Pin
18 . . . Movable end fitting
19 . . . Fixed end fitting
31 . . . Partitioning plate
32, 37 . . . Connecting plate engagement portion
34, 36 . . . Partitioning plate engagement portion
51 . . . Lateral partitioning plate
52 . . . Lateral partitioning plate-inserting hole The invention has been described by way of examples only and those skilled in the art will readily recognize that certain changes and modifications may be made to the examples without departing from the spirit and scope of the appended claims.

I claim:

1. The cable protection and guide device includes a plurality of link bodies which are articulably connected in the longitudinal direction of the device with said cable inserted therein; each of said link bodies comprises: a pair of link plates spaced on both sides of the cable, each said link plate includes an inner circumferential portion and an outer circumferential portion, an inner circumferential connecting plate having a length, a front portion and a rear portion and an outer circumferential connecting plate having a length, a front portion and a rear portion, said inner circumferential connecting plate integrally molded with said inner circumferential portions of said link plates, said outer circumferential connecting plate removably interconnecting with said outer circumferential portions of said link plates, each of said connecting plates laterally bridge said link plates; a partitioning plate having front and rear portions, said partitioning plate faces said link plates and is supported by at least said inner circumferential connecting plate; said connecting plates include connecting engagement portions formed along the front and rear portions thereof and spaced apart from each other and extending along the lengths thereof; said partitioning plate includes front and rear engagement portions; said front and rear engagement portions of said partitioning plate interengage front and rear engagement portions of at least said inner circumferential connecting plate, said partitioning plate being sandwiched between said inner and outer circumferential connecting plates; and, said connecting plate engagement portions and said partitioning plate engagement portions are trapezoidally shaped.

2. The cable protection and guide device as claimed in claim 1 wherein said front and rear engagement portions of said partitioning plate interengage front and rear engagement portions of said outer circumferential connecting plate.

3. The cable protection and guide device as claimed in claim 1 further comprising a plurality of partitioning plates.

* * * * *